United States Patent Office 3,388,178
Patented June 11, 1968

3,388,178
PREPARATION OF SOLUTIONS OF LITHIUM-CONJUGATED POLYENE HYDROCARBON ADDUCTS
Conrad W. Kamienski, Arthur C. Diesing, and Robert C. B. Morrison, Gastonia, N.C., assignors to Lithium Corporation of America, Inc., New York, N.Y., a corporation of Minnesota
No drawing. Filed Dec. 27, 1963, Ser. No. 334,013
10 Claims. (Cl. 260—665)

ABSTRACT OF THE DISCLOSURE

Preparation of lithium-conjugated polyene hydrocarbon adducts by providing a mixture containing (a) a dispersion of finely divided lithium in an inert liquid, (b) a volatile liquid aromatic hydrocarbon, and (c) an inert liquid ether, gradually adding a conjugated polyene hydrocarbon while maintaining the reaction mixture at a low temperature, preferably below 0° C., said reaction being advantageously carried out in the presence of a catalyst in the form of a lithium-conjugated polyene hydrocarbon adduct added to the reaction mixture in the form of a solution in a volatile liquid aromatic hydrocarbon, passing an inert gas over the reaction product mixture to purge the same of the ether, then adding an additional quantity of a volatile liquid hydrocarbon and warming the reaction product mixture, and then filtering to remove unreacted lithium metal whereby to produce a clear solution of the lithium-conjugated polyene hydrocarbon adduct in said volatile liquid hydrocarbon.

Our invention relates to the preparation of lithium-conjugated polyene hydrocarbon adduct solutions in which said adducts have substantial stability over appreciable periods of time.

The preparation of organic solvent solutions of lithium-conjugated polyene hydrocarbon adducts has heretofore been known as may be seen from such illustrative U.S. patents as Nos. 2,816,936, 2,865,969 and 3,091,606. Various methods for the preparation of said adducts have been suggested, as shown, for instance, by the aforesaid patents but, generally speaking, such methods involve reacting a conjugated polyene hydrocarbon, such as isoprene or 1,3-butadiene, with lithium metal, in the form of wire, or in the form of a dispersion of fine particles of lithium metal in an inert liquid hydrocarbon, in an ether reaction medium such as dimethyl ether, with or without other inert medium materials, said reaction medium also allegedly advantageously including a polycyclic aromatic hydrocarbon, such as naphthalene, as an activator. It is also alleged, in connection with certain of such methods, that, in order to obtain, in selective manner and in high yields, the desired adducts, in the form of dilithium dimers of the conjugated polyene hydrocarbons, the particle size of the finely divided lithium metal be so controlled that more than 30% of the particles are less than 5 microns in size and that the average particle size be less than 8 microns.

Such prior methods have a number of disadvantages in one or another of the areas of low yields of adduct, instability of the adduct compositions, cumbersomeness of procedural aspects, long reaction times, and the precise character or structure of the adduct which plays an important role in the properties and utilities of said adducts.

The present invention, in its method aspects, involves a series of correlated steps which result in the production of compositions in the form of aromatic hydrocarbon solutions, particularly benzene solutions, of lithium-conjugated polyene hydrocarbon adducts, especially dilithium-isoprene dimers, which are characterized by stability against breakdown over extended periods of time, of the order of one or two months and not infrequently for periods of time substantially in excess of two months, when stored at low temperatures out of the presence of air, moisture and light. So far as can be ascertained, stabilities of lithium-conjugated polyene hydrocarbon adducts, such as lithium-isoprene adducts of the character obtained pursuant to the practice of the present invention, have not been reported in the literature.

In its more limited and particularly important aspects, the method of the present invention involves providing a mixture of (a) a dispersion of lithium in mineral oil, the particle size of the lithium being essentially in the range of 0.01 to 0.1 mm. in diameter, (b) benzene, and (c) dimethyl ether; adding thereto, as a catalyst, a preformed or previously prepared lithium-isoprene adduct dissolved in benzene; gradually adding isoprene while maintaining the reaction mixture at a temperature in the range of —20 to —30 degrees C.; adding additional benzene to the reaction mixture; passing an inert gas for instance, argon, over the reaction mixture to purge the same of the dimethyl ether; adding an additional quantity of benzene and warming the reaction mixture to a temperature of 30 to 35 degrees C.; and then filtering to remove unreacted lithium metal whereby to form a clear solution of the lithium-isoprene adduct in benzene.

In order that the full details of the present invention will be fully appreciated, the following examples are provided. These examples are illustrative of the practice of the method of the invention and it will be understood that variations and modifications may be made therein, in a number of particulars, as hereafter pointed out, without in any way departing from the fundamental principles and teachings provided herein. The examples, therefore, are not to be construed in any way as limitative of the scope of the invention. In said examples, the lithium metal dispersion utilized was one in which not more than 5% of the lithium metal particles were less than 10 microns in diameter, the majority of said particles being in the 10 to 20 micron size range, the average particle size being about 20 microns in diameter.

Example 1

28.5 g. of lithium metal, as a 30 weight percent dispersion in mineral oil, were charged to an argon-swept reaction flask fitted with a mechanical stirrer, thermometer, addition funnel and reflux condenser. The flask was cooled to —25 degrees C. Then, 304 g. of benzene were added to the dispersion and 755 g. of dimethyl ether were condensed into the foregoing mixture. The addition funnel was filled with 255 g. of isoprene. The temperature was maintained at —25 degrees C. and stirring was begun. A benzene solution (0.8 N concentration) of a preformed dilithium-polyisoprene adduct was added. Then, 5 g. of isoprene were rapidly added to the reaction mixture in the flask. The reaction initiated immediately as indicated by a temperature rise and the formation of a green color. The isoprene was slowly added during a 1 hour period. When the reaction was complete, the excess dimethyl ether was removed and additional benzene was added to obtain a product solution that was 0.9 molar in dilithium polyisoprene adduct. The product solution was filtered. The yield was 94%.

Example 2

Into an argon-swept 22 liter round bottom flask mounted in an outer cooling container and equipped with stirrer, thermometer, reflux condenser, gas inlet tube and filter tube, there were accurately metered 490.2 g. of a 28.5 weight percent dispersion of lithium metal in mineral oil, the particle size of the lithium metal being essentially in the range of 0.01 to 0.1 mm. in diameter. A volume of 2.4 liters of benzene was added, stirring was begun and the flask and contents were cooled to −40 degrees C. Then 4.8 liters of dimethyl ether were condensed as a liquid into said mixture and 300 ml. of a 0.93 molar solution in benzene of an adduct of lithium and isoprene were added and the contents of the flask were stirred for 15 minutes. Then 40 ml. of isoprene were added. An instantaneous temperature rise occurred followed by a vivid green coloration, and some refluxing of benzene occurred. The remainder of a weight of 1290.5 g. (18 mols.) in which is included the above 40 ml. of isoprene was added gradually over a period of 2 to 2½ hours while maintaining the temperature at −20 to −30 degrees C. Then, promptly, 6.3 liters of benzene were added and argon gas was passed over the reaction mixture for 16 to 24 hours to purge the solution of dimethyl ether. Thereupon, 6 liters of benzene were added and the reaction mixture was warmed in a water bath to 30–35 degrees C. and kept at such temperature for 1 hour. The solution was filtered, to remove unreacted lithium metal, into an argon-flushed 5 gallon bottle. The resulting final solution was a clear red to reddish brown liquid having a lithium-isoprene adduct concentration of 0.88 equivalent per liter (80.5% conversion of lithium metal to soluble form).

In the practice of the method of the present invention, pure or essentially pure lithium metal or a commercial source of lithium metal is effectively used. It has heretofore been suggested (see U.S. Patent No. 3,091,606 referred to above) to employ a small percentage of sodium metal, of the order of about 0.25 to about 5 weight percent based on the lithium metal, in the production of lithium-conjugated diene adducts, said adducts being utilized as initiators for polymerizing 1,3-butadiene. The sodium is stated to increase the reaction rate between the lithium metal and the conjugated diene monomer, to bring about adducts of higher molarity, based on the lithium metal, and to inhibit polymerization of the said monomer. While small amounts of sodium can be used in conjunction with the lithium metal, as described above, and, similarly small amounts of other metals such as potassium, rubidium, cesium and calcium, can be present, such as unnecessary since excellent rates of reaction are obtained with the obtention of lithium-conjugated polyene hydrocarbon adducts having excellent utility as stereospecific catalysts for the polymerization of conjugated diene hydrocarbons such as isoprene, 1,3-butadiene and the like, as well as for other purposes for which adducts of this type have heretofore been proposed.

The reaction to produce the lithium-conjugated polyene hydrocarbon adducts is carried out in a solvent medium which contains an inert ether, and which medium especially advantageously also contains a volatile aromatic hydrocarbon, particularly benzene or toluene, especially the former. While dimethyl ether is the ether of choice, other inert ethers can be used such as glycol dimethyl ether and diethylene glycol dimethyl ether. Numerous additional inert ethers which can be used are disclosed in the aforementioned patents. Generally speaking, the ether will contsitute from 20 to 30 volume percent of the total organic solvent content of the final solution.

Among the aromatic hydrocarbon solvents, generally of volatile character, which can be used in place of benzene in that part of the method which involves the formation of the lithium-conjugated polyene hydrocarbon adduct are, for example, toluene, xylenes, n-heptane and n-hexane, or mixture of any two or more thereof (comprising generally from 10 to 20% of the total of the hydrocarbon solvent to be used).

The organic solvents, generally of volatile character, used for the formation of the final lithium-conjugated polyene hydrocarbon adduct, said solvents constituting generally from 80 to 90% of the total organic solvent employed, can be of aromatic character, examples of which are benzene, toluene and xylenes; straight chain and branched chain $C_5$ to $C_{10}$ hydrocarbons such as n-pentane, n-hexane and n-heptane, or mixtures of paraffin hydrocarbons such as petroleum ether; mixtures of aromatic and paraffinic hydrocarbon solvents such as lactol spirits; and compatible mixtures of any two or more of the foregoing.

While it is especially advantageous that benzene, toluene or a similar volatile aromatic hydrocarbon be present in the reaction medium during the formation of the lithium-conjugated polyene hydrocarbon adduct, it has also been found that reasonably satisfactory results and good yields of the desired adduct, for instance of the order of 82% based on the conversion of lithium metal to "soluble" lithium in the form of said adduct, have been obtained where the benzene, toluene or similar volatile aromatic hydrocarbon was added after the formation of the adduct.

With regard to the lithium metal dispersions used in carrying out the method of the invention, it is especially desirable to use a mineral oil dispersion of the lithium metal However, other media of inert character, advantageously normally liquid paraffinic hydrocarbons, such as kerosene, isooctane, n-heptane and n-octane, can be utilized as dispersion media. The particle size of the lithium is somewhat variable but, for best results, as stated above, the diameters of the lithium metal particles in the mineral oil or like dispersions should be within the range of about 0.01 to 0.1 mm.

The concentration of the adducts of the present invention, in aromatic hydrocarbon solvent solutions, produced in accordance with the present invention, is high. Thus, for instance, concentrations in the range of about 1.5 mols/liter of the lithium-isoprene adducts of the present invention in benzene have been obtained which have shown good stability, although concentrations of 1 mol/liter and below have even greater stability over longer periods of time. Where toluene is used in place of benzene, generally comparable concentrations of the lithium-isoprene adducts are obtained, said solutions also exhibiting good stability characteristics. Where n-heptane is used in place of benzene, the maximum concentration of the lithium-isoprene adducts is appreciably less, being of the order of about 0.25 mol/liter, but the stability of the resulting solutions is good.

While the present invention is of particular importance in connection with the production of lithium adducts of isoprene polymers, it is also of significant value in regard to the production of lithium adducts of other conjugated polyene hydrocarbon polymers, particularly dienes, of straight chain or branched chain character, as, for example, 1,3-butadiene; dialkyl-butadienes, particularly those in which the alkyl groups contain from 1 to 3 carbon atoms; 2,5-dimethyl-2,4-hexadiene; 1,3,5-hexatriene; allocimene; myrcene; and various others such as are disclosed, for instance, in the aforementioned U.S. patents. Also encompassed within the scope of the present invention are lithium adducts of vinylidene-substituted aromatic compounds such as styrene, alpha-methyl styrene, 3-vinyltoluene, 1-vinyl naphthalene, as well as numerous other vinylidene-substituted hydrocarbons such as are disclosed in U.S. Patent No. 3,091,606.

The ratios of the lithium metal to conjugated polyene hydrocarbon, particularly isoprene or 1,3-butadiene, are variable but, in the usual case, will fall within the range of from 0.8 to 1.25 gram atoms of lithium per gram mol of said polyene, especially from 0.91 to 1 gram atom of lithium per mol of said polyene.

Reaction temperatures are also somewhat variable and, from an overall standpoint, will normally fall within the range of −25 to 25° C., under superatmospheric pressure. Generally speaking, the reaction will be carried out in the range of −50° C. to −5° C., and, more advantageously, in the range of −30° to −5° C. The internal temperature is desirably raised, during the reaction, at a rate of 4 to 5° C. per hour with concomitant removal of the ether, such as dimethyl ether, at atmospheric pressure. It is desirable, at the conclusion of the reaction, to apply heat, with or without vacuum, to aid in the removal of the ether from the reaction product, for instance, after dilution with benzene as described above, but temperatures appreciably above 50° C. should not be used since product decomposition tends to occur. Removal of the ether can, of course, also be effected by vacuum or by purging with an inert gas.

Feed rates of the conjugated polyene monomer are variable, but, generally speaking, feed rates in the range of 0.25 to 10 ml./min./gram atom of lithium are desirable.

The concentration of lithium metal in the reaction mixture will generally fall within the range of 0.5 to 6 gram atoms of lithium per liter of organic solvent or solvents, a particularly preferred range being from 1.5 to 4 gram atoms of lithium per liter.

Yields of recovered lithium-conjugated polyene hydrocarbon adducts, pursuant to the present invention, range from 75 to essentially 100% as determined by both total alkalinity and active carbon-lithium content in the solution (Anal. Chem., 33, 468–470, 1961), these two values being normally equivalent and not varying from each other by more than 5 to 10%. Yield is expressed as the number of equivalents of product obtained divided by the maximum number of equivalents possible multiplied by 100.

Analyses of reaction products made in accordance with the present invention indicate that the major component, in the case of the use of conjugated diene hydrocarbons such as isoprene and 1.3-butadiene, is a dilithio adduct of the diene dimers. More specifically, in the case of isoprene, the analyses indicate the major component to be the dilithio adduct of the dimer of isoprene.

Analyses of the lithium-conjugated polyene hydrocarbon adducts were made by hydrolysis of the product as obtained from the reaction followed by fractional distillation of the organic layer obtained from the hydrolysis. The purity of the fractions was confirmed by gas chromatographic analysis. Infra-red and nuclear magnetic resonance spectroscopy were utilized as well as ozonolysis. On the basis of said analyses, it has been ascertained that the component in largest amount of said adducts, in the case of isoprene, is a material with the empirical composition $C_{10}H_{16}Li_2$. An illustrative formula of the structure of the dimer or dimers appears to be as follows:

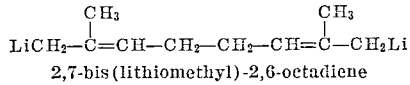

2,7-bis(lithiomethyl)-2,6-octadiene

On hydrogenation of the hydrolyzed dimer or dimers, the structures of all of the (hydrolyzed) components of said adduct or adducts become:

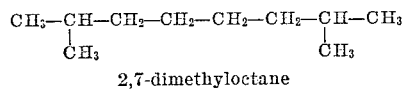

2,7-dimethyloctane

In addition to the major dimer component, smaller amounts of a product having the empirical formula $C_{15}H_{24}Li_2$ are obtained, corresponding to a dilithio adduct of the trimer of isoprene. Still smaller amounts of dilithio adducts of polymers of isoprene higher than the trimer are also usually present. The following table shows some typical compositions which have been obtained pursuant to the present invention. The lithium was used in the form of a dispersion as described above in Example 1.

| Example No. | Reaction Conditions | | | | |
|---|---|---|---|---|---|
| | Solvent | Isoprene [1] | Li [1] | Temp., °C. | Time, Hrs. |
| A | DME/B | 0.66 | 0.52 | −22 | 4.5 |
| B | DME/B | 1.19 | 1.06 | −20 | 4.5 |
| C | DME/B | 1.80 | 2.10 | −25 | 1.75 |
| D | DME/B | 0.55 | 0.52 | −20 | 3.5 |

| Example No. | Molar Ratio Li:Isoprene | Total Alkalinity | Yield [2] | Dimer | Trimer | Higher Polymer |
|---|---|---|---|---|---|---|
| A | 0.79 | 1.16 | 75.0 | 41.1 | 25.9 | 33.0 |
| B | 0.89 | 1.13 | 86.0 | 62.2 | 21.4 | 16.4 |
| C | 1.16 | 0.97 | 99.0 | 77.5 | 13.6 | 8.9 |
| D | 0.95 | 1.03 | 83.0 | 68.8 | 21.0 | 10.2 |

[1] Expressed in moles.
[2] Based on carbon-lithium (C-Li) content.
DME=Dimethylether; B=Benzene.

It will be seen, from said table, that the amount of dimeric product in the total product increases from 41% to 78% as the molar ratio of lithium to isoprene is increased from 0.79 to 1.16. At the same time, the amount of trimeric product decreases from 26% to 14%, and higher polymeric product from 33% to 9% in this reactant ratio range.

The particularly advantageous compositions of the present invention are benzene solutions of lithium-isoprene polymer adducts, or lithium-butadiene polymer adducts, containing from 0.6 to 1.5 mols per liter of said adducts, and wherein said adducts contain at least 65% and up to 100%, by weight, of a mixture of the dimers and trimers of isoprene or butadiene, as the case may be, with the dimer content exceeding the trimer content and generally being at least 1.5 times the trimer content and, better still, from 2 to 6 times the trimer content, by weight.

The reaction conditions and particular ranges of proportions of reactants produce high yields of the desired reaction products and, in addition, they are most conservative of raw materials or reactants. Dimeric and trimeric lithium adducts represent the maximum utilization of both lithium metal and isoprene, or similar conjugated polyene hydrocarbons, because two carbon-lithium bonds are present in an oligomer molecule containing the least number of monomeric units.

What we claim as new and desire to protect by Letters Patent of the United States is:

1. A method of preparing lithium-conjugated polyene hydrocarbon adducts which comprises providing a mixture of (a) a dispersion of finely divided lithium in an inert liquid, (b) a volatile liquid aromatic hydrocarbon, and (c) an inert liquid ether; gradually adding a conjugated polyene hydrocarbon while maintaining the reaction mixture at a low temperature; passing an inert gas over the reaction mixture to purge the same of the ether; adding an additional quantity of a volatile liquid hydrocarbon and warming the reaction mixture; and then filtering to remove unreacted lithium metal whereby to form a clear solution of the lithium-conjugated polyene hydrocarbon adduct in said volatile liquid hydrocarbon.

2. A method of preparing lithium-conjugated polyene hydrocarbon adducts which comprises providing a mixture of (a) a dispersion of lithium in an inert liquid, the particle size of the lithium being essentially in the range of 0.01 to 0.1 mm. in diameter, (b) a member selected from the group consisting of benzene and toluene, and (c) an inert liquid ether; gradually adding a conjugated polyene hydrocarbon while maintaining the reaction mixture at a temperature below 0 degrees C.; passing an inert gas over the reaction mixture to purge the same of the ether; adding an additional quantity of a member selected from the group consisting of benzene and toluene and warming the reaction mixture; and then filtering to remove unreacted lithium metal whereby to form a clear solution of the lithium-conjugated polyene hydrocarbon adduct in said member selected from the group consisting of benzene and toluene.

3. A method of preparing lithium-conjugated polyene hydrocarbon adducts which comprises providing a mixture of (a) a dispersion of lithium in a saturated liquid hydrocarbon with which the lithium is essentially unreactive, the particle size of the lithium being essentially in the range of 0.01 to 0.1 mm. in diameter, (b) a volatile liquid aromatic hydrocarbon, and (c) a non-reactive liquid ether; adding thereto, as a catalyst, a lithium-conjugated polyene hydrocarbon adduct dissolved in a volatile liquid aromatic hydrocarbon; gradually adding a conjugated polyene hydrocarbon while maintaining the reaction mixture at a temperature below 0 degrees C.; adding additional volatile liquid aromatic hydrocarbon to the reaction mixture; passing an inert gas over the reaction mixture to purge the same of the ether; adding an additional quantity of volatile liquid aromatic hydrocarbon and warming the reaction mixture; and then filtering to remove unreacted lithium metal whereby to form a clear solution of the lithium-conjugated polyene hydrocarbon adduct in the volatile liquid aromatic hydrocarbon.

4. A method of preparing lithium-conjugated diene adducts which comprises providing a mixture of (a) a dispersion of lithium in mineral oil, the particle size of the lithium being essentially in the range of 0.01 to 0.1 mm. in diameter, (b) benzene, and (c) dimethyl ether; adding thereto, as a catalyst, a lithium-conjugated diene adduct dissolved in benzene; gradually adding a conjugated diene while maintaining the reaction mixture at a temperature below 0 degrees C.; passing an inert gas over the reaction mixture to purge the same of the dimethyl ether; adding an additional quantity of benzene and warming the reaction mixture; and then filtering to remove unreacted lithium metal whereby to form a clear solution of the lithium-conjugated diene adduct in benzene.

5. A method of preparing lithium-isoprene adducts which comprises providing a mixture of (a) a dispersion of lithium in mineral oil, the particle size of the lithium being essentially in the range of 0.01 to 0.1 mm. in diameter, (b) benzene, and (c) dimethyl ether; adding thereto, as a catalyst, a lithium-isoprene adduct dissolved in benzene; gradually adding isoprene while maintaining the reaction mixture at a temperature in the range of −20 to −30 degrees C.; adding additional benzene to the reaction mixture; passing an inert gas over the reaction mixture to purge the same of the dimethyl ether; adding an additional quantity of benzene and warming the reaction mixture to a temperature of 30 to 35 degrees C.; and then filtering to remove unreacted lithium metal whereby to form a clear solution of the lithium-isoprene adduct in benzene.

6. A method of preparing lithium-1,3-butadiene adducts which comprises providing a mixture of (a) a dispersion of lithium in mineral oil, the particle size of the lithium being essentially in the range of 0.01 to 0.1 mm. in diameter, (b) benzene, and (c) dimethyl ether; adding thereto, as a catalyst, a lithium-1,3-butadiene adduct dissolved in benzene; gradually adding 1,3-butadiene while maintaining the reaction mixture at a temperature in the range of −20 to −30 degrees C.; adding additional benzene to the reaction mixture; passing an inert gas over the reaction mixture to purge the same of the dimethyl ether; adding an additional quantity of benzene and warming the reaction mixture to a temperature of 30 to 35 degrees C.; and then filtering to remove unreacted lithium metal whereby to form a clear solution of the lithium-1,3-butadiene adduct in benzene.

7. A method of preparing lithium-1,3-butadiene adducts which comprises providing a mixture of (a) a dispersion of finely divided lithium in mineral oil, (b) benzene, and (c) dimethyl ether; adding thereto, as a catalyst, a lithium-1,3-butadiene adduct dissolved in benzene; gradually adding 1,3-butadiene while maintaining the reaction mixture at a low temperature; adding additional benzene to the reaction mixture; passing an inert gas over the reaction mixture to purge the same of the dimethyl ether; adding an additional quantity of benzene and warming the reaction mixture; and then filtering to remove unreacted lithium metal whereby to form a clear solution of the lithium-1,3-butadiene adduct in benzene.

8. A method of preparing lithium-conjugated diene adducts which comprises providing a mixture of (a) a dispersion of finely divided lithium in mineral oil, (b) benzene, and (c) dimethyl ether; adding thereto, as a catalyst, a lithium-conjugated diene adduct dissolved in benzene; gradually adding a conjugated diene while maintaining the reaction mixture at a low temperature; passing an inert gas over the reaction mixture to purge the same of the dimethyl ether; adding an additional quantity of benzene and warming the reaction mixture; and then filtering to remove unreacted lithium metal whereby to form a clear solution containing from 0.6 to 1.5 mols of said adduct per liter of said solution, from 65 to 100%, by weight, of said adduct constituting a mixture of dimers and trimers of said conjugated diene and said dimer constituting at least 1.5 times the amount of the trimer by weight.

9. A volatile aromatic hydrocarbon solution containing from 0.6 to 1.5 mols per liter of a lithium-conjugated polyene hydrocarbon adduct, from 65 to 100%, by weight, of said adduct constituting a mixture of dimers and trimers of said polyene hydrocarbon, the dimers constituting at least 1.5 times the trimers, by weight.

10. A benzene solution containing from 0.6 to 1.5 mols per liter of a lithium-conjugated diene hydrocarbon adduct selected from the group consisting of lithium-isoprene polymer adducts and lithium-butadiene polymer adducts, from 65 to 100%, by weight, of said adducts constituting a mixture of dimers and trimers of said diene hydrocarbons, the dimers constituting at least 1.5 times the trimers, by weight.

References Cited

UNITED STATES PATENTS

| | | | |
|---|---|---|---|
| 2,816,936 | 12/1957 | Hansley et al. | 260—665 |
| 3,090,819 | 5/1963 | Foster | 260—665 |
| 3,091,606 | 5/1963 | Hsieh | 252—431 |
| 3,175,997 | 3/1965 | Hsieh | 260—94.2 |
| 3,177,190 | 4/1965 | Hsieh | 260—94.2 |

TOBIAS E. LEVOW, *Primary Examiner.*

A. P. DEMERS, *Assistant Examiner.*